Jan. 11, 1927.
C. W. JACKSON
1,613,893
MOVABLE SEAT FOR AUTOMOBILES AND THE LIKE
Filed Nov. 2, 1925
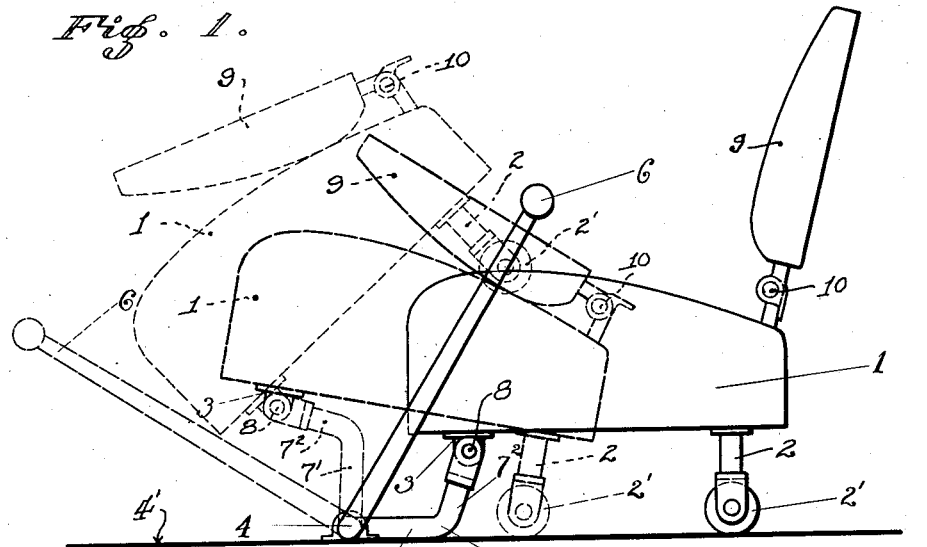
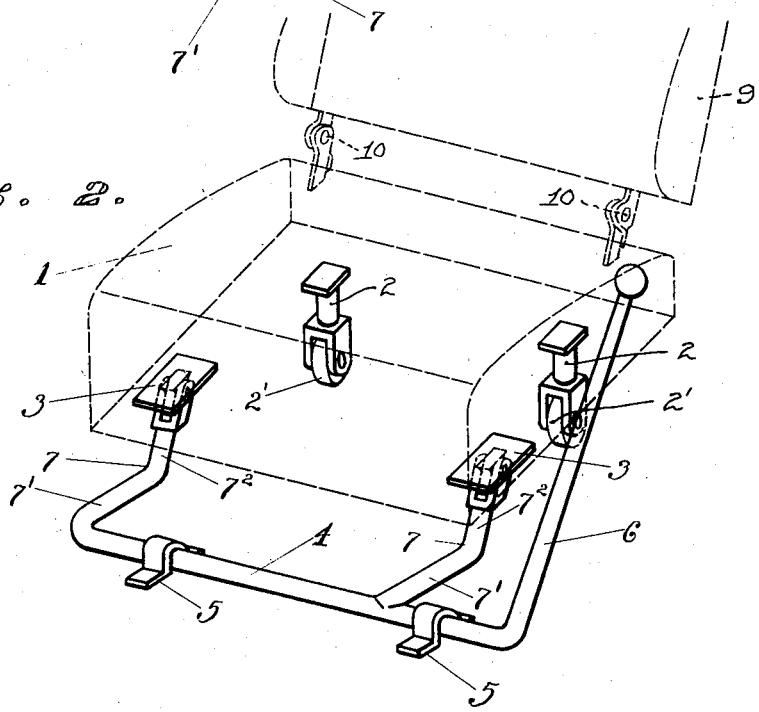

Patented Jan. 11, 1927.

1,613,893

UNITED STATES PATENT OFFICE.

CALLIS W. JACKSON, OF SAN FRANCISCO, CALIFORNIA.

MOVABLE SEAT FOR AUTOMOBILES AND THE LIKE.

Application filed November 2, 1925. Serial No. 66,235.

The present invention relates to movable seats especially adapted for automobiles.

In certain types of automobile bodies it is customary to provide a movable or folding seat, which, when not occupied, may be swung into a vertical position to take up less space in the body. Such seats are commonly used as the front seats in the so-called coach type of body, provided with only one door on each side, and are arranged to swing forwardly to provide free passage from the door to the rear seat. This arrangement compels the occupant of the front seat to alight in order to permit said seat to be folded to give access to the rear seat.

The principal object of the present invention is to provide a seat which not only may be folded out of the way when not occupied, but which may be quickly and easily shifted, without folding, and whether occupied or not, sufficiently to give access to the space behind it. The principal advantage in this construction, of course, lies in the fact that the occupant need not be disturbed during the shifting or moving of the seat.

A further object of the invention is to provide a seat of the described type which can be quickly installed, at small cost, in existing automobile bodies, without necessitating any change in the body itself.

Although my invention is especially applicable to the front seats of the so-called coach type bodies, its use is not limited thereto, but it may be embodied in shiftable or movable seats in any situation. It is also to be understood that the form, proportion, and arrangement of the several parts of the device may be varied, within the limits of the claims hereto appended, without departing from the spirit of the invention as set forth in said claims.

With this in view, a preferred embodiment of my invention will now be fully described with reference to the accompanying drawings, wherein:—

Fig. 1 is a side elevation of my seat.

Fig. 2 is a perspective thereof, the seat itself being shown in broken lines.

In the drawings, the reference numeral 1 designates a seat, which is supported at its rear by legs 2 preferably provided with rollers 2'. Hinge brackets 3 are secured to the under side of the seat 1 near its forward edge. A transverse horizontal shaft 4 is rotatably secured by bearing cleats 5 to the floor 4', Fig. 1, upon which the seat rests, and said shaft is bent upwardly at one end to form a hand lever 6 positioned within convenient reach of the occupant of the seat. The shaft 4 is also provided with a pair of preferably integral arms 7, each having two portions forming an obtuse angle between them, the portions 7' lying horizontally in the normal position, and the portions $7^2$ rising in a nearly vertical direction. The upper ends of the latter are pivotally connected at 8 with the hinge brackets 3, as shown. Attached to the seat 1 is a back 9, preferably hinged as at 10 to enable it to fold forwardly and down upon the seat in the usual manner, as shown in broken lines in Fig. 1.

The normal position of the seat is shown in Fig. 2 and in full lines in Fig. 1. In this position, the arm portions 7' rest flat upon the floor, thereby providing, with the portions $7^2$, legs for supporting the forward edge of the seat. When it is desired to shift the seat forwardly, the lever 6 is moved forwardly and downwardly, thereby oscillating the shaft 4 and swinging the arms 7 into the position shown in broken lines in Fig. 1. In this position the arm portions 7' are substantially vertical, and the portions $7^2$ may bear against the under side of the seat 1 to form supports and stops to prevent further movement.

It will be seen that this shifting of the seat may be done while it is occupied, and may be done, moreover, by the occupant himself, the forward edge of the seat being supported by the arms 7, and its rear edge by the legs 2 and rollers 2', the latter rolling freely along the floor during the shifting of the seat.

The seat can be folded up and forwardly at any time by merely lifting up its rear portion and swinging it about the pivots 8 into a vertical or upright position; and this can be done with the arms 7 either in their normal position or in their forward position, as is indicated by the lighter broken lines in Fig. 1. The back 9 may or may not be folded down, as desired.

Thus, for example, when my device is applied to the front seat of an automobile body of the so-called coach type, the occupant, may, without getting out, shift himself and his seat forwardly to permit access to the rear seat, and may return to his normal position with equal facility; or if the seat be unoccupied, it can be folded forwardly to an upright position to give even freer access to the rear seat.

Having thus described my invention, what I claim as new and desire to protect by Letters Patent of the United States is:—

1. A device for the described purpose comprising a fixed support; a seat; a transversely disposed oscillating shaft mounted upon said fixed support; an arm extending from said shaft and pivotally connected with said seat to form a support for a portion thereof, said arm having a portion adapted to bear against said fixed support when the shaft is in one position and a second portion, angularly disposed with respect to the first portion, and adapted to bear against the under side of said seat when the shaft is oscillated to a second position; a lever extending beside the seat for operation to oscillate said shaft to shift the seat horizontally; and means for supporting the remaining portion of said seat.

2. A device for the described purpose comprising a seat; a transversely disposed oscillating shaft having one end portion bent upwardly to form an operating lever positioned beside said seat, and having its opposite end portion bent to form an arm pivotally connected with said seat to provide a support for one portion thereof; and means for supporting the remaining portion of said seat.

3. In combination, a fixed support, a shaft mounted thereon for oscillation and provided with an arm extending laterally therefrom, a seat mounted for forward and rearward movement transversely to the shaft and one portion thereof supported by said arm, a pivotal connection between said arm and seat, a lever connected to one end of and extended laterally from said shaft at one side of the seat, and means for supporting the remaining portion of said seat.

In testimony whereof I have signed my name to this specification.

CALLIS W. JACKSON.